2 Sheets—Sheet 1.
BROWN & BARTLETT.
Grain and Grass Harvester.
No. 1,283. Reissued Feb. 25, 1862.
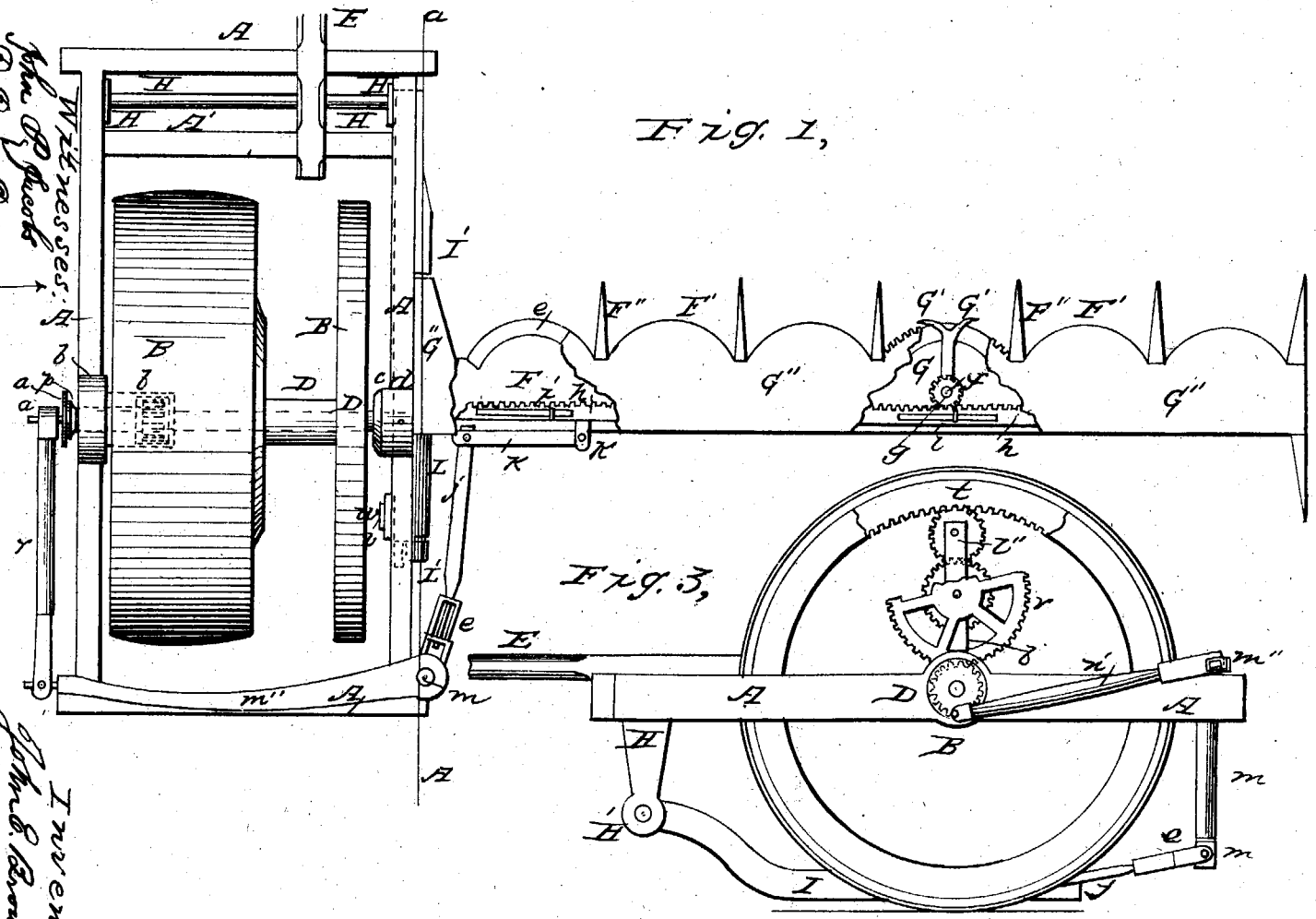
Witnesses:
John P. Jacobs
D. Dana Dodge
Inventors
John E. Brown
Stephen S. Bartlett
By their attorney
Thos. H. Dodge
N. PETERS, Photo-Lithographer, Washington, D. C.

2 Sheets—Sheet 2.
BROWN & BARTLETT.
Grain and Grass Harvester
No. 1,283. Reissued Feb. 25, 1862.
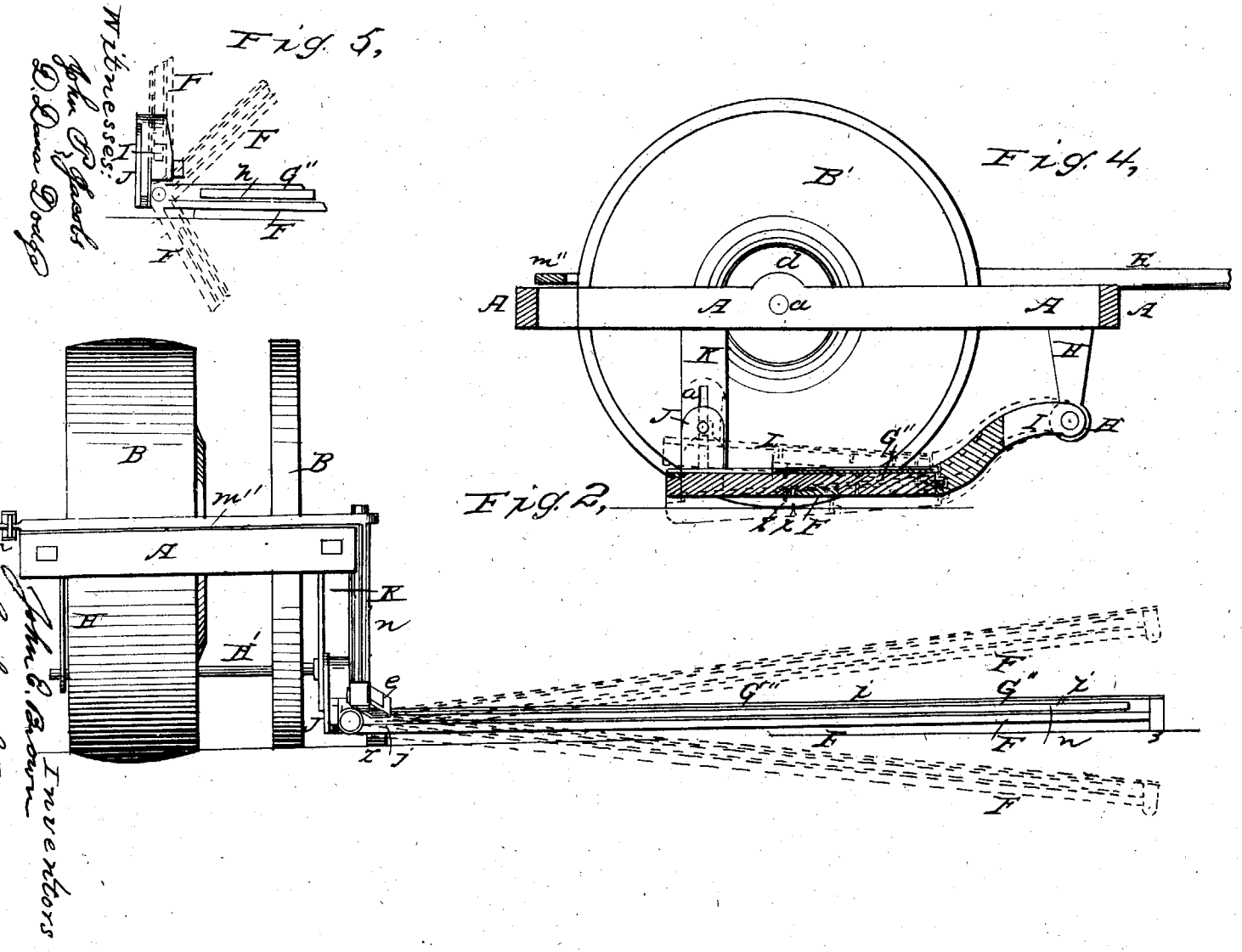
Witnesses:
John P. Jacobs
D. Dana Dodge
Inventors
John E. Brown
Stephen S. Bartlett
By their Attorney
Thos. H. Dodge
N. PETERS. Photo-Lithographer, Washington, D. C.

UNITED STATES PATENT OFFICE.

JNO. E. BROWN, OF WOONSOCKET, AND STEPHEN S. BARTLETT, OF PROVIDENCE, RHODE ISLAND, AND THOMAS H. DODGE, OF WASHINGTON, D. C., ASSIGNEES OF SAID JNO. E. BROWN AND STEPHEN S. BARTLETT.

IMPROVEMENT IN GRAIN AND GRASS HARVESTERS.

Specification forming part of Letters Patent No. 12,121, dated January 2, 1855; Reissue No. 1,111, dated January 1, 1861; Reissue No. 1,283, dated February 25, 1862.

*To all whom it may concern:*

Be it known that we, JOHN E. BROWN, of Woonsocket, in the county of Providence and State of Rhode Island, and STEPHEN S. BARTLETT, formerly of said Woonsocket, but now residing in the city of Providence, in said county of Providence and State of Rhode Island, have invented certain new and useful Improvements in Grain and Grass Harvesters; and we do hereby declare that the following is a full, clear, and exact description of the same, reference being had to the accompanying drawings, forming a part of this specification, in which—

Figure 1 represents a plan view of a Brown and Bartlett mowing-machine embracing our said improvements. Fig. 2 represents a rear view of the same machine with the finger-beam being shown in three different positions, as will be more fully described hereinafter. Fig. 3 represents a side view, looking in the direction of arrow 1, Fig. 1, some of the parts being represented broken away to show the position of the gearing more fully. Fig. 4 represents in black lines a longitudinal section on line A *a*, Fig. 1; and Fig. 5 represents a detached section of some of the parts to illustrate the flexible connection of the finger-beam with the main frame, as will be hereinafter more fully set forth.

In the accompanying drawings, A A A A represent the main frame of the machine, which is supported by two wheels, B B′—one at each side of the machine—and connected to a tubular shaft, D, which turns on a stationary axle, D′.

E represents a section of the tongue, to which the team is to be attached in any well-known and suitable manner. This tongue is attached to the front of the frame in a rigid manner, so that it supports and keeps the main frame A, on which the driver rides, from tipping down or up as it is drawn over the ground, while the wheels B B′ keep the said frame from tipping over laterally.

As the particular cutting device, together with the mechanism for operating the same, represented in the drawings have been described somewhat in detail in another patent of even date herewith, it is not deemed necessary to repeat such description here, as reference can be had to such description, and we shall therefore only describe so much of the machine represented in the annexed drawings as is necessary to illustrate the invention which forms the subject of this patent, and the nature of which consists, first, in the combination of the following elements in a grass-harvesting machine, viz: a main frame, two supporting-wheels to sustain said main frame laterally and at the proper height above the ground, a rigid tongue to draw and steady the frame by, and a floating finger-bar or cutter-stock; second, so combining in a grass-harvester a floating finger-bar or cutter-stock, the frame on which the driver rides, and the tongue by which the machine is drawn forward as that the finger-bar which supports the cutting apparatus can rise and fall freely at either or both ends without affecting the motions of said frame or tongue; third, the combination and arrangement, in a grass-harvesting machine, of a frame to carry the driver, two wheels to support said frame, a tongue to draw the machine by, and a double-jointed finger-bar attachment, in such manner that the draft shall be on a line between said wheels and so as to bring the off horse close up to the side of the grass to be cut and in advance of the front inner corner of the machine, while the cutting apparatus projects entirely to the right of the machine and is there sustained by its double-jointed connection, which allows it to conform freely to the inequalities of the surface of the ground; fourth, combining a floating finger-bar with the frame of a grass-harvesting machine, so that said floating finger-bar shall project entirely from the right side of the machine.

F represents a finger-bar or cutter-stock, and by reason of its flexible or double-jointed connection with the frame-work of the machine is what we term a "floating" finger-bar, since it is free to rise up bodily or at either end to conform to the inequalities in the surface of the ground without affecting the motion of the driving-wheels and driver's frame. One good way of connecting the finger-bar so that it can thus float or freely conform to the undulations of the ground is shown in this machine, and consists in attaching two hangers, H H, to the under side of the front of the frame, one at each corner, and providing their lower ends with suitable bearings to receive a rock-shaft, H′, with its inner end projecting sufficiently far beyond the inner hanger to permit of the front elevated end of the drag-bar, arm, or coupling-piece I being securely fastened thereto. The bar I extends back and down, as shown in the drawings, and is recessed out, as seen at I′, to receive the front journal of the rock-shaft L, while a box, L′, is fastened to the rear end of said bar or coupling-piece I to receive the rear journal of said rock-shaft. In a recess on the under side of this rock-shaft is fitted and fastened the heel of the finger-bar F, as indicated at *x*, Fig. 4. The heel of the cap-piece G″, which covers the rear of the cutters, is fastened to the top of the rock-shaft. Some portions of the cap-piece G″ are represented broken away in the drawings to expose the parts covered thereby. The rear end of the bar, arm, or coupling-piece I can vibrate freely up and down above the plane on which the wheels B B′ rest, two such positions being shown in Fig. 4, one in red and the other in dotted lines. This vibration is not dependent either on the up and down motions of the main frame, since said arm or bar I vibrates around or on the axis of the shaft H′. This freedom of motion or vibration of arm or bar I allows the heel end of the finger-bar or cutter-stock, which is fastened to the rock-shaft L, to rise and fall in the same free and independent manner, while the outer end of the finger-bar and cutting apparatus is equally free to rise and fall, by reason of the freedom of the rock-shaft L to turn in its bearings in the bar I. In Fig. 2 two of such positions which the outer end of the finger-bar can assume are shown, one in red and the other in dotted lines, while its range of motion is still further illustrated in Fig. 5, should it ever be found desirable to elevate or depress the finger-bar so much. The rear end of arm *j* turns when the finger-bar rises and falls at its outer end in the socket *l*, which is hinged to the lower hub end of a vertical shaft, *m*, which turns in a tubular stand, *m′*, and has the inner end of lever *m″* fastened to its upper end, and by which shaft *m* is rocked back and forth by means of connecting-rod *n′*, whose front end is attached to a crank-pin, *o*, on the disk *o′*, on the outer end of a hollow shaft, *p*, which extends through the outer rail of the main frame, and turns on the outer end of the stationary shaft D′, being sustained and operated in such position, as is fully described in the specification of the patent before referred to. By the rocking back and forth of shaft *m* the front end of arm *j* is vibrated, which in turn causes the rack-bar *h* to reciprocate, since it is connected to the rear projection, *k′*, on the latter by a link or connecting-piece, *k*, thus giving a reciprocating motion to cutters G, whose rear ends are fastened to pinions *f*, turning on studs *g*, fast in the upper side of the finger-bar F. Only one cutter is shown in the drawings, as that serves to illustrate the operation.

To give additional strength to bar or coupling-piece I, to enable it to resist great and unusual lateral strain consequent upon the use of the machine on very rough ground, a guide-piece, J, is fastened to the inner rear side of bar I, so that its lower end shall not project below the lower surface of the drag-bar, but having its upper end projecting up some distance above the top of the said bar, and having a guide stud or pin projecting therefrom and passing through a slot in the lower end of another guide-piece, K, whose upper end is fastened to the main frame. A nut or head, *w*, on the inner end of stud *v* prevents the latter from being sprung out of its slot, which is made of such length as to allow the rear end of bar I and the heel of the finger-bar or cutter-stock to have the necessary freedom of motion to enable them to rise and fall to conform to the inequalities of the surface of the ground independent of the up and down motions of the main frame or the main wheels.

It will be seen from the above that the cutting apparatus projects entirely from the right side of the machine, and is there sustained by its double-jointed connection in such manner that the entire cutting apparatus can rise or fall bodily or at either end independent of the up and down motions of the driving-wheels, tongue, or draft-beam, or the frame on which the driver is to ride or be supported. Consequently the finger-bar and cutting apparatus are left free to float or to conform freely to all the inequalities in the surface of the ground, thereby cutting the stubble on such ground very even and short. The position, too, of the cutting apparatus, draft, main wheels, and frame is such that the team occupies the most convenient position as respects the frame and cutting apparatus to enable the driver to guide and control his team, while at the same time watching the operation of the cutting apparatus.

We do not limit ourselves to the use of any particular cutting apparatus or mode of operating the same. It is also manifest that our invention may be arranged to apply to other harvesting-machines.

Having described one practical mode or way in which the invention which forms the subject of this patent can be applied to use, what we claim as our invention, and desire to secure under this patent, is—

1. The combination of the following elements in a grass-harvesting machine, viz: a main frame, two supporting-wheels to sustain said frame laterally and at the proper height above the ground, a rigid tongue to draw and steady the machine by, and a floating finger-bar, for the purposes stated.

2. So combining in a grass-harvester a floating finger-bar, a frame to support the driver, and the tongue or draft-beam by which the machine is drawn forward as that the finger-bar which supports the cutting apparatus can rise and fall freely at either or both ends without affecting the motion of said frame or tongue.

3. The combination and arrangement, in a grass-harvesting machine, of a frame to carry the driver, two wheels to support said frame, one at each side thereof, a tongue to draw the machine by, and a double-jointed finger-bar attachment, substantially as and for the purposes stated.

4. Combining the floating finger-bar with the frame of a grass-harvesting machine, so that said floating finger-bar shall project entirely from the right side of the machine, substantially as and for the purposes stated.

In witness whereof we have hereunto subscribed our names.

JOHN E. BROWN.
STEPHEN S. BARTLETT.

Witnesses:
THOMAS STEEN,
ALBERT MOWRY.